Jan. 31, 1956    G. HOHWART ET AL    2,733,072
FINGER CHUCK
Filed Dec. 2, 1954    2 Sheets-Sheet 2
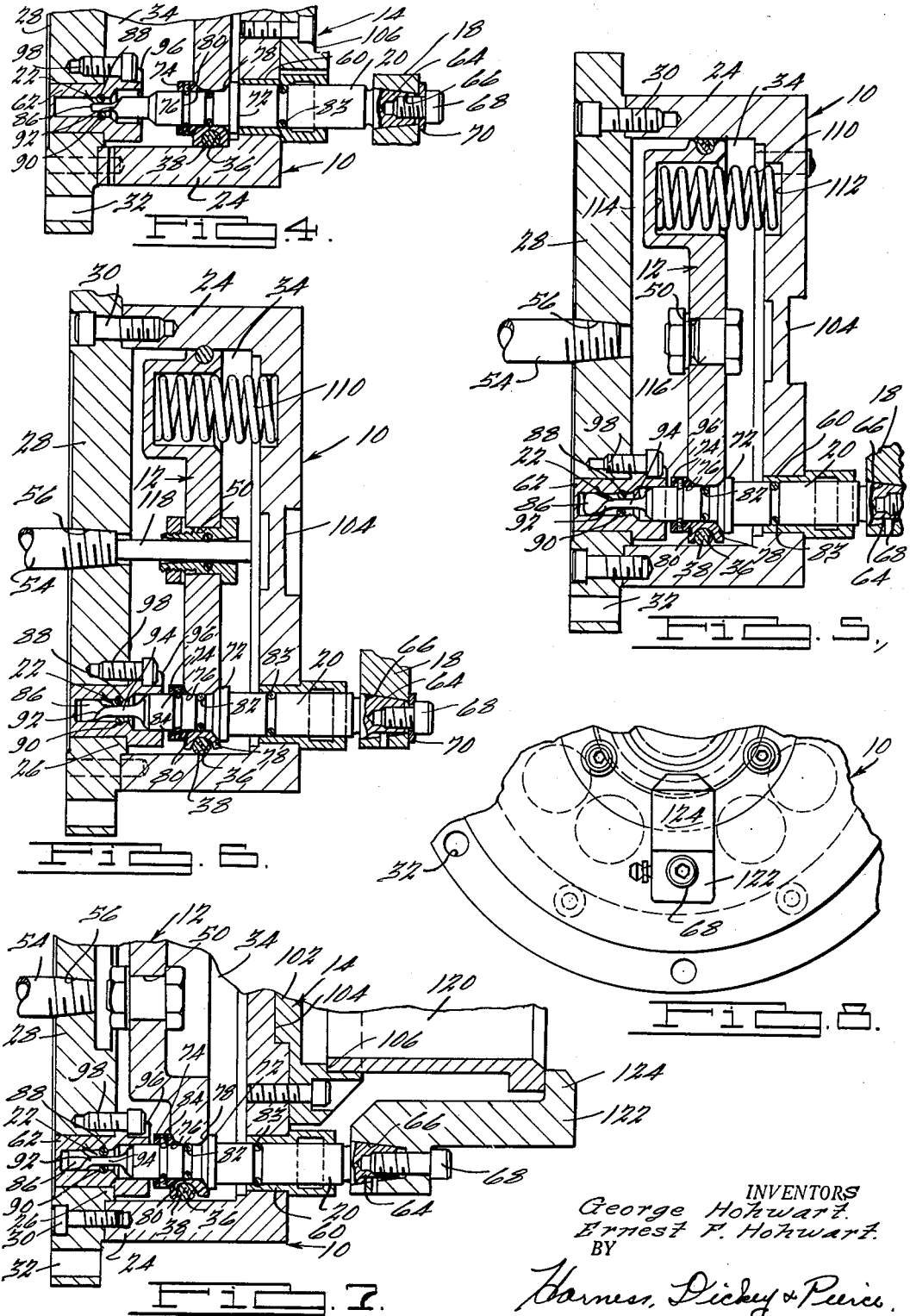
INVENTORS
George Hohwart
Ernest F. Hohwart
BY
Harness, Dickey & Pierce
ATTORNEYS

United States Patent Office 2,733,072
Patented Jan. 31, 1956

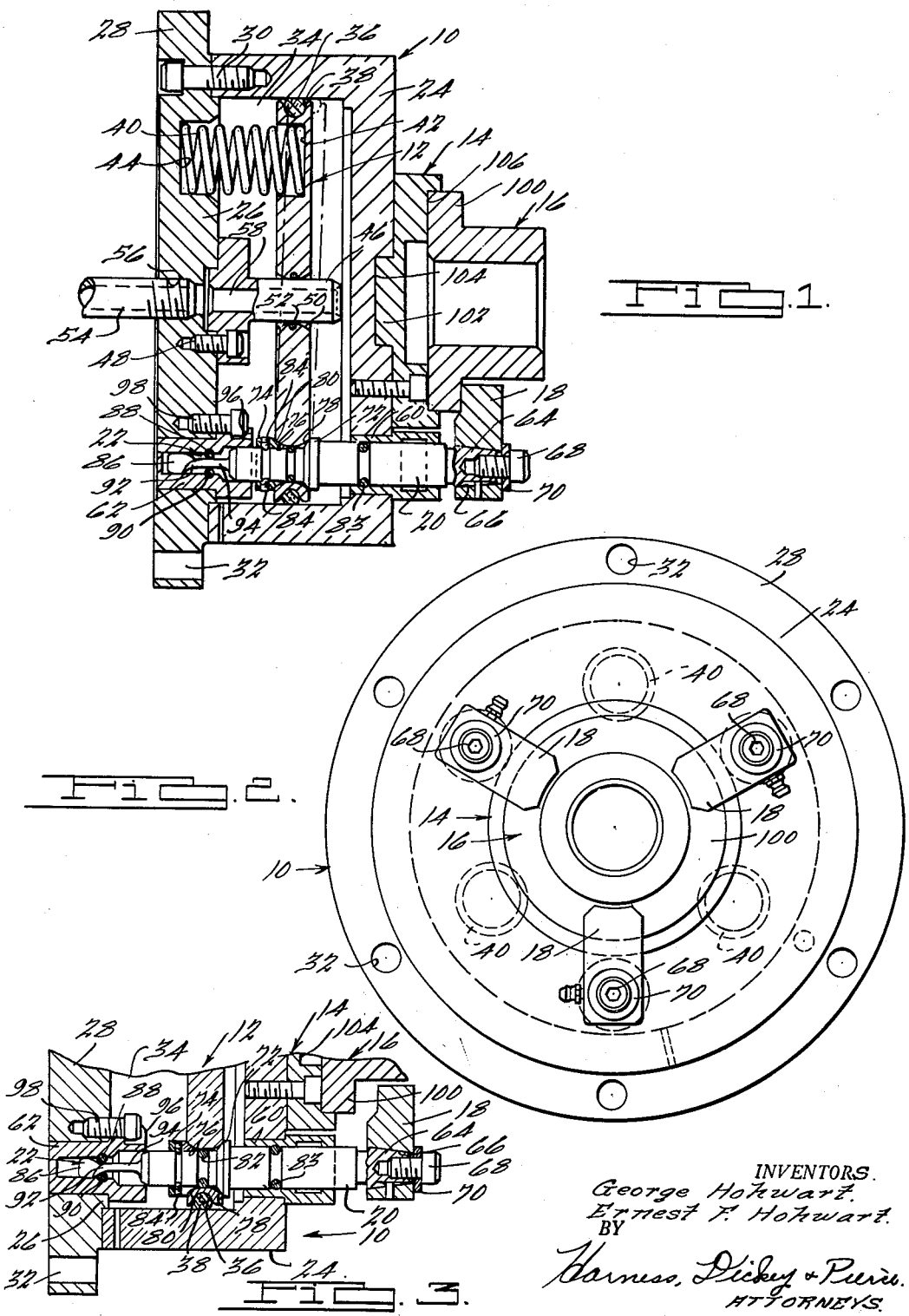

2,733,072

FINGER CHUCK

George Hohwart, Farmington Township, Oakland County, and Ernest F. Hohwart, Detroit, Mich., assignors to N. A. Woodworth Company, Ferndale, Mich., a corporation of Michigan Application December 2, 1954, Serial No. 472,638

8 Claims. (Cl. 279—4)

This invention relates to new and useful improvements in chucks and more particularly to an improved form of finger chuck.

In a finger chuck, the work is supported on a suitable workholding fixture, and mechanical fingers are moved into engagement with the work to hold it securely on the fixture. These fingers are movable into and out of engagement with the workpiece at will and when engaged with the work hold it sufficiently tightly to permit machining or other operations to be performed thereon.

A finger chuck is capable of rapid operation and is particularly suited for holding castings, forgings, and semi-machined parts under conditions not requiring the part to be positioned with extreme accuracy. Also, as a finger chuck clamps endwise against the workpiece, it is well suited for clamping thin-walled parts or, for that matter, any part having a frail section susceptible to damage by being clamped radially on the O. D. or I. D.

An important object of the present invention is to provide a finger chuck that is simple and sturdy in construction and that is capable of rapid operation to engage and release a workpiece disposed therein.

Another object of the invention is to provide a finger chuck that is uniquely constructed so as to be readily adaptable to a number of different machines.

Still another object of the invention is to provide a finger chuck having clamping fingers adapted to engage endwise against a workpiece and operable to hold the workpiece securely for a machining or other operation thereon.

Other objects and advantages of the invention will be apparent during the course of the following description.

In the drawings forming a part of this specification and wherein like numerals are employed to designate like parts throughout the same:

Fig. 1 is a longitudinal, sectional view of a finger chuck embodying the invention and showing the clamping fingers engaged with a workpiece mounted on the chuck;

Fig. 2 is a front elevational view of the chuck;

Fig. 3 is a fragmentary, sectional view similar to Fig. 1 but showing the clamping fingers released from the workpiece;

Fig. 4 is a fragmentary, sectional view similar to Fig. 3 but showing the clamping fingers turned away from the workholder so as to permit workpieces to be readily placed on or removed from the chuck;

Fig. 5 is a longitudinal, sectional view of a modified finger chuck embodying the invention;

Fig. 6 is a longitudinal, sectional view showing still another modified form of the invention;

Fig. 7 is fragmentary, longitudinal, sectional view of still another modified chuck embodying the invention; and Fig. 8 is a fragmentary, front elevational view of the form of the invention shown in Fig. 7.

Reference is first had to the form of the invention shown in Figs. 1–4 which comprises a cylinder 10 having a piston 12 mounted for reciprocation therein. Suitable means hereinafter described in detail is provided for reciprocally actuating the piston in the cylinder. A work holder 14 is mounted on the front of the cylinder 10, and the holder is uniquely formed to receive a particular workpiece 16. In this connection it will be readily appreciated that the chuck can be readily adapted to accommodate different sizes and forms of workpieces and that the work holder 14 may vary considerably in size and shape, depending upon the physical characteristics of the workpiece. A plurality of clamping fingers 18 disposed concentrically around the work holder 14 are adapted to engage the workpiece 16 as shown in Fig. 1. Actuators 20 carrying the clamping fingers extend rearwardly through the cylinder 10 and are connected to the piston 12. Manifestly, reciprocation of the piston 12 acts through the actuators 20 to move the clamping fingers 18 axially into and out of engagement with the workpiece 16. In order to facilitate insertion and removal of the workpiece 16, means designated generally at 22 are provided for rotating the fingers 18 away from the workpiece after the fingers have moved axially out of engagement therewith. All of the clamping fingers 18 are actuated simultaneously, and they all swing away from the work when moved to the work-releasing position so as to leave the holder 14 completely unobstructed. As a result, workpieces can be quickly mounted on and removed from the chuck. Conversely, after a workpiece has been inserted into the work holder, the piston 12 is retracted and this causes the fingers to be first rotated inwardly over the work and then moved axially against and into clamping engagement with the work.

More particularly, the cylinder 10 comprises a generally cup-shaped member 24 having the open end thereof piloted on the central embossment 26 of an adapter plate 28 and fastened securely to the plate by an annular series of screws 30. The adapter plate 28 projects radially outwardly from the member 24 and the projecting portion thereof is formed with openings 32 adapted to receive screws (not shown) for fastening the chuck to a spindle or other part of a machine on which the chuck is to be mounted. In any event, the member 24 and adapter plate 28 collectively define a cylinder chamber 34 in which the piston 12 operates.

The piston 12 here shown is in the form of a flat disk, and the periphery of the disk is spaced slightly from the annular wall of the cylinder 34. As clearly shown in the drawings, the piston 12 is formed around its periphery with a groove 36, and a sealing ring 38 in the groove projects radially from the piston and seats against the cylinder wall to establish a fluidtight seal therewith. Compression springs 40 confined in the cylinder 34 behind the piston 12 normally urge the latter forwardly. The forward ends of the springs 40 are seated in sockets 42 provided in the rear face of the piston 12, and the rearward ends of the springs are seated in sockets 44 provided in the confronting inner face of the adapter plate 28.

The piston is retracted by air under pressure admitted into the cylinder 34 ahead of the piston. In this connection, it will be observed that the piston 12 is piloted on a tubular adapter 46 disposed centrally of the cylinder 34 and fastened to the adapter plate 28 by screws 48. A central opening 50 provided in the piston 12 receives the adapter 46, and an O-ring 52 partially embedded in the piston around the opening 50 seals the space between the opening and the adapter. An air pipe 54 is screwed into a central opening 56 in the adapter plate 28 and the opening 56 communicates with the central passage 58 of the adapter 46. The passage 58 in turn communicates with the cylinder 34 ahead of the piston 12. Thus, air under pressure admitted through the pipe 54 enters the cylinder 34 ahead of the piston 12 and exerts pressure against the piston which causes it to retract against the action of the compression springs 40. It is significant to note in this connection that the central opening 50 of the piston 12 is rounded or flared in both directions from the middle thereof so that the piston is free to rock at least a limited amount on the adapter 46 as shown by broken lines in Fig. 1. The fingers 18 are moved into clamping engagement with the work 16 by retraction of the piston 12 in the cylinder 10; and since the piston moves back against the counteracting force of the compression springs 40, the pressure applied against the work by the fingers can be readily controlled.

As shown in Fig. 2, three work-clamping fingers 18 are provided for holding the work 16, and all three fingers are identical. However, as suggested, any number of clamping fingers can be used, and, as a practical matter, the number may vary in different situations, depending upon the size and shape of the workpiece. In general, however, three clamping fingers are preferred, as they provide a holding force which is adequate for most situations, and this particular number of clamping fingers assures that each finger engages the work and that all fingers are pressed with equal force against the work piece.

Since each work-clamping finger 18 is carried by an actuator 20, it follows from the foregoing that three actuators also are provided in the chuck assembly. These actuators are identical in construction and operation and a detailed description of one, therefore, will suffice. As shown in Fig. 1, the actuator 20 is generally rod-shaped and it is supported for longitudinal sliding movement by spaced bearings 60 and 62 in the cylinder 24 and adapter plate 28 respectively. The portion of the actuator extending forwardly of the front bearing 60 is formed with a tapered head 64 which extends into and snugly fits a correspondingly tapered opening 66 in the clamping finger 18, and the finger is fastened securely but detachably to the head 64 by a screw 68 and washer 70. The clamping finger 18 is detachably connected to the actuator 20 so that a different form of clamping finger can be substituted, if necessary, to adapt the chuck for a different size or shape of workpiece 16. The portion of the actuator 20 extending between the bearings 60 and 62 passes through the piston 12, and the piston is confined between collars 72 and 74 on the actuator, which collars prevent movement of the piston longitudinally relative to the actuator. It is significant, however, to note that the opening 76 in he piston which receives the actuator is flared in opposite directions from the middle thereof and that the collars have inwardly tapered surfaces 78 and 80 respectively to provide an essentially universal connection between the piston and the actuator which permits the piston to move angularly on the actuator as shown by broken lines in Fig. 1. An O-ring 82 on the actuator at substantially the center of the opening 76 seals the joint between the actuator and the piston. An O-ring 83 around the actuator 20 within the front bearing 60 closes the joint between the actuator and the bearing and prevents loss of pressure fluid from the cylinder 34 ahead of the piston 12. In the form of the invention shown, the collar 72 is fixed on the actuator and the collar 74 is adjustable, and set screws 84 hold the latter collar in a selected, adjusted position.

The means 22 for rotating the clamping fingers 18 into and out of engagement with the workpiece 16 comprises a flat-sided, bar-shaped extension 86 on the rearward end of the actuator 20 and a pair of co-operating pins 88 and 90 carried by the bearing 62. As shown in Fig. 1, the pins 88 and 90 extend transversely with respect to and on opposite sides of the extension 86. Thus, the pins 88 and 90 are stationary, and when the actuator 20 is moved longitudinally by the piston 12, the extension 86 travels between and relative to the pins. In this connection it will be observed that the extension 86 has a right-angle twist 92 therein intermediate the ends thereof, and it is formed with a relatively long, straight section 94 immediately ahead of the twisted portion 92. The arrangement is such that the pins 88 and 90 traverse the straight section 94 as the fingers 18 move into clamping engagement with the workpiece 16 and during the initial movement of the clamping fingers away from the workpiece. After the clamping fingers 18 disengage and move a substantial distance away from the workpiece the pins 88 and 90 engage the twisted portion 92 of the extension 86 and cause the latter to rotate ninety degrees to turn the clamping fingers 18 a corresponding amount away from the workpiece 16. In order to assure proper positioning of the fingers 18 when the chuck is assembled, the bearing 62 is formed with a peripheral recess 96 which receives the head of a locating screw 98. At assembly, the bearing 62 is rotated until the recess 96 aligns with the tapped hole which receives the screw 98, and the latter is then screwed into the hole to hold the bearing in the rotatably adjusted position. When thus positioned, the pins 88 and 90 position the clamping fingers 18 for proper engagement with and disengagement from the workpiece 16.

The workpiece 16 here shown is a tubular part having a radial flange 100, and the work holder 14 is shaped to accommodate this particular form of workpiece. More particularly, the work holder 14 is a generally disk-shaped member having a central, rearwardly extending embossment 102 which enters and snugly fits a socket 104 provided centrally in the forward end of the cylinder 10. Also, the holder 14 is provided in the front face thereof with a centrally disposed socket 106 which receives and snugly fits the base-flange portion of the workpiece 16. As clearly shown in the drawings, the base flange 100 of the workpiece 16 extends forwardly of the work holder 14, and the clamping fingers 18 engage rearwardly against the flange to hold the workpiece 16 clamped securely against the holder 14.

In use, air to the pipe 54 is normally shut off so that there is no air pressure in the cylinder chamber 34 ahead of the piston 12, and the compression springs 40 hold the piston fully advanced in the cylinder. In this position of the piston 12 the clamping fingers 18 and actuators 20 are fully advanced and the pins 88 and 90 are in engagement with the portion of the extension 86 behind the twisted portion 92, as shown in Fig. 4, to hold the fingers turned away from the clamping position shown in Fig. 1. In this position, the clamping fingers 18 are unobstructively disposed to permit a workpiece 16 to be easily and quickly placed in the work holder 14. After a workpiece 16 has been placed in the holder 14, the chuck is operated to clamp the workpiece by admitting air under pressure into the pipe 54. Flow of air through the pipe 54 is controlled by conventional valve means (not shown), and the latter may be operated either manually or automatically in any suitable or conventional manner. When air under pressure is admitted into the cylinder chamber 34 ahead of the piston 12, the latter is retracted against the action of the compression spring 40, and as the piston retracts it acts through the actuators 20 to retract the clamping fingers 18. During initial retractive movement of the piston, the twisted portions 92 of the actuator extensions 86 pass between the guide pins 88 and 90 to turn the clamping fingers 18 inwardly for engagement with the workpiece 16. Thereafter, continued retraction of the piston 12 brings the clamping fingers 18 into pressed contact with the workpiece 16. During this phase of the operation the guide pins 88 and 90 traverse the straight inner portion 94 of the actuator extensions 86 so that the fingers 18 are not rotatably actuated but are in fact held securely in work-clamping position.

If the front of the base flange 100 is exactly at right angles to the axis of the chuck, all of the work-clamping fingers 18 engage the work 16 at the same time and all apply equal force thereagainst. It is a feature of the invention, however, that the same end result is accomplished even though the front base of the flange or other part engaged by the fingers 18 is not precisely at right angles to the axis of the work. By reason of the fact that the piston 12 is capable of rocking or turning angularly relative to the air adapter 46 and actuators 20, it adjusts itself automatically to compensate for irregularities or angular disposition of the surface engaged by the clamping fingers 18. In other words, the piston 12 adjusts itself automatically within the range permitted by the various universal connections to seat all of the clamping fingers 18 solidly and with equal pressure against the workpiece 16. When work has been performed on the piece 16, air under pressure to the pipe 54 is shut off and the latter is vented to permit air in the cylinder 34 ahead of the piston 12 to escape. Compression springs 40 immediately advance the piston 12 and return the clamping fingers 18 to the initial position. The chuck operates essentially rapidly and workpieces can be changed quickly.

Fig. 5 shows a modified construction wherein the workpiece is clamped by spring pressure alone. The modified construction has particular utility for clamping workpieces with relatively light pressure. There are situations where relatively frail parts of the workpiece must be clamped or where relatively light clamping pressure is sufficient to hold the workpiece for the operation to be performed thereon. Under these circumstances it is better to clamp the workpiece by spring pressure rather than by air pressure as in the form of the invention first described.

In this form of the invention a plurality of compression springs 110 are provided in the cylinder chamber 34 ahead of the piston 12 and opposite ends of the springs preferably are seated in recesses 112 and 114 in the confronting radial surfaces of the cylinder and piston. The central opening 50 of the piston is closed by a plug 116 and the air-inlet pipe 54 opens directly into the cylinder 34 behind the piston.

The parts of the chuck not specifically referred to are identical to corresponding parts in the form of the invention first described and, except for the differences specifically pointed out, the chuck operates in substantially the same manner as the first form of the invention. As suggested, the chuck operates by spring pressure and has the advantage of running with the air off. Air pressure is used only to open the chuck.

The form of the invention shown in Fig. 6 is adapted particularly for slow speed, heavy-duty operations. In this form of the invention the compression springs 110 are mounted in the cylinder chamber 34 ahead of the piston 12 as in the form of the invention shown in Fig. 5. The air-supply pipe 54 opens into the cylinder chamber 34 behind the piston 12 as also shown in Fig. 5 and the air-supply system is provided with a second pipe 118 which extends forwardly through the piston and communicates with the cylinder chamber 34 ahead of the piston. The two air-supply pipes 54 and 118 are separately controlled in any suitable or conventional manner.

In practice, the fingers 18 are clamped by shutting off air to the pipe 54. This permits the compression spring 10 to retract the piston 12 and move the fingers 18 against the workpiece as in the second form of the invention. Thereafter, if desired, air under pressure is admitted into the cylinder chamber 34 through the pipe 118 to augment the clamping pressure of the fingers 118 against the workpiece. To release the workpiece, air under pressure in the inner pipe 118 is shut off and air is admitted under pressure into the cylinder 34 behind the piston through pipe 54. Air pressure in the cylinder acting against the piston 12 advances the latter against the action of compression springs 110, and air in the cylinder chamber 34 ahead of the piston is vented in any suitable or conventional manner through the inner pipe 118.

Figs. 7 and 8 illustrate particularly the manner in which the chuck can be adapted to varying sizes and forms of workpieces. In this form of the invention a generally tubular workpiece 120 is shown in the chuck, and the jaws 122 are adapted to clamp axially against the outer end of the workpiece. In order to adapt the jaws 122 to the particular form of workpiece shown, the jaws are made longer than in the other forms of the invention, and they are formed at the outer ends thereof with inturned flanges 124 which overlie the workpiece when the fingers are rotated to the work-clamping position. This form of the invention is shown primarily to illustrate the adaptability and versatility of the clamp, and it will be readily apparent that a great many different sizes and forms of workpieces can be clamped by the chuck. In many instances the work-clamping fingers will have to be designed for the particular workpiece being chucked, and in any particular instance this manifestly can be done readily by any skilled mechanic.

Having described the invention, we claim:

1. A chuck comprising a cylinder, a piston mounted for reciprocation in said cylinder, clamping fingers in front of and spaced from said cylinder, actuators carrying said fingers extending rearwardly into said cylinder, said actuators being connected to said piston for mutual reciprocatory travel and being rotatable and universally movable relative to said piston, and means coactive with said actuators rendered operative by reciprocatory travel of said actuators in one direction to rotate said fingers inwardly and by reciprocatory travel of said actuators in the opposite direction to rotate said fingers outwardly.

2. A chuck comprising a cylinder, a piston mounted for reciprocation in said cylinder, clamping fingers in front of and spaced from said cylinder, actuators carrying said fingers extending rearwardly into said cylinder and through said piston, universal connections interconnecting said actuators and said piston, said connectors uniting the actuators and said piston for mutual reciprocatory travel while permitting independent rotation of the actuators relative to the piston and angular movement of the piston relative to said actuators, and means coactive with said actuators rendered operative by reciprocatory travel of said actuators in one direction to rotate said fingers inwardly and by reciprocatory travel of said actuators in the opposite direction to rotate said fingers outwardly.

3. A chuck comprising a cylinder, a piston mounted for reciprocation in said cylinder, work clamping fingers in front of and spaced from said cylinder, actuators carrying said fingers extending rearwardly into said cylinder, said actuators being connected to said piston for mutual reciprocatory travel and being rotatable and universally movable relative to said piston, and means coactive with said actuators rendered operative for initial reciprocatory travel of said piston in one direction to rotate said fingers inwardly and by subsequent reciprocatory travel of said piston in the same direction to move the inwardly directed fingers linearly without further rotative movement thereof.

4. A chuck comprising a cylinder, a piston mounted for reciprocation in said cylinder, clamping fingers in front of and spaced from said cylinder, actuators carrying said fingers extending rearwardly into said cylinder and through said piston, universal connections interconnecting said actuators and said piston, said connections uniting the actuators and said piston for mutual reciprocatory travel while permitting independent rotation of the actuators relative to the piston and angular movement of the piston relative to the actuators, and means coactive with said actuators rendered operative by initial reciprocatory travel of said piston in one direction to rotate said fingers inwardly and by subsequent reciprocatory travel of said piston in the same direction to move the inwardly directed fingers linearly without appreciable further rotative movement thereof, said means also rendered operative by initial reciprocatory movement of said piston in the other direction to move said fingers linearly and by subsequent reciprocatory travel of said piston in said other direction to rotate said fingers outwardly.

5. A chuck comprising a cylinder, a piston mounted for reciprocation in said cylinder, work-supporting means on one end of said cylinder, clamping fingers disposed around said work-holding means, finger supports carrying said fingers extending rearwardly into said cylinder and connected to said piston for mutual reciprocatory travel, said supports being independently rotatable relative to said piston, and said piston being angularly movable relative to said supports, and means coactive with said supports rendered operative by reciprocatory travel of said piston in one direction to rotate said fingers inwardly to engage a workpiece on said work-holding means, said means rendered operative by reciprocatory travel of said piston in the opposite direction to rotate said fingers outwardly out of engagement with said workpiece.

6. A chuck comprising a cylinder, a piston mounted for reciprocation in said cylinder, clamping fingers in front of and spaced from said cylinder, supports carrying said fingers extending rearwardly into said cylinder and through said piston, means interconnecting said supports and said piston for mutual reciprocatory travel while permitting said supports to rotate independently relative to the piston, and the piston to move angularly relative to said supports, bearings on opposite sides of said piston receiving said supports and guiding the same during reciprocatory and rotative movement thereof, and means associated with one of said bearings coactive with said supports and rendered operative by reciprocatory travel of said piston in one direction to rotate said fingers inwardly and by reciprocatory travel of said piston in the opposite direction to rotate said fingers outwardly.

7. A chuck comprising a cylinder, a piston mounted for reciprocation in said cylinder, clamping fingers in front of and spaced from said cylinder, supports carrying said fingers extending rearwardly into said cylinder and through said piston, means interconnecting said supports and said piston for mutual reciprocatory travel while permitting said supports to rotate independently relative to the piston, and the piston to move angularly relative to said support, bearings on opposite sides of said piston receiving said supports and guiding the same during reciprocatory and rotative movement thereof, and cam means on the rearward ends of said supports operable by reciprocatory travel of said piston in one direction to rotate said fingers inwardly to a work-clamping position and by reciprocation of said piston in the opposite direction to rotate said fingers outwardly to a work-releasing position.

8. A chuck comprising a cylinder; a piston mounted for reciprocation in said cylinder; clamping fingers in front of and spaced from said cylinder; supports carrying said fingers extending rearwardly into said cylinder and through said piston; means interconnecting said supports and said piston for mutual reciprocatory travel while permitting said supports to rotate independently relative to the piston and the piston to move angularly relative to said supports; bearings on opposite sides of said piston receiving said supports and guiding the same during reciprocatory and rotative movement thereof; flat, bar-shaped extensions on the rearward ends of the supports, each extension having a twisted portion; and guide means closely embracing said extension and coactive therewith upon reciprocatory travel of said piston to rotate said fingers into and out of a work-engaging position.

No references cited.